Dec. 6, 1932.   F. S. STICKNEY   1,889,764
INSTRUMENT POINTER STRUCTURE
Filed March 18, 1932
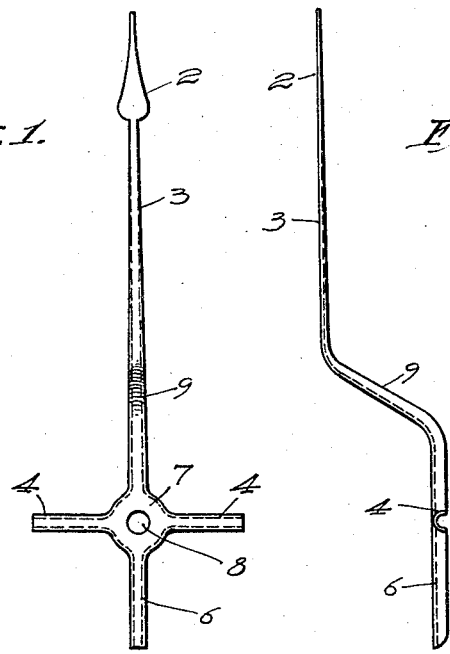
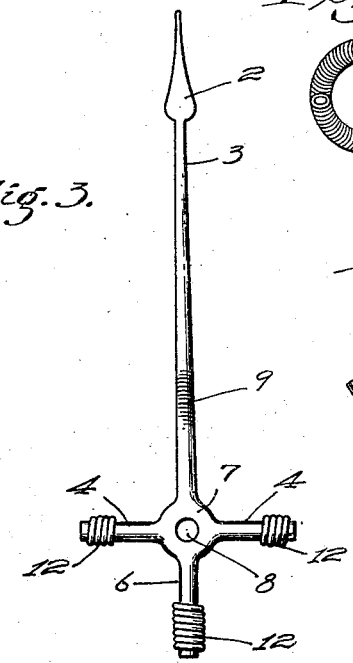
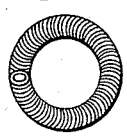
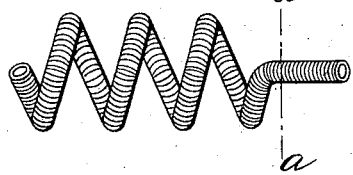
INVENTOR
Fernald S. Stickney.

Patented Dec. 6, 1932

1,889,764

UNITED STATES PATENT OFFICE

FERNALD S. STICKNEY, OF WEST ORANGE, NEW JERSEY, ASSIGNOR TO WESTINGHOUSE ELECTRIC & MANUFACTURING COMPANY, A CORPORATION OF PENNSYLVANIA

INSTRUMENT POINTER STRUCTURE

Application filed March 18, 1932. Serial No. 599,696.

My invention relates to instrument pointers and it has for one of its objects to provide, in one piece, a pointer structure of a type in which corresponding parts have heretofore been separately fabricated and subsequently joined.

Another object of my invention is to reduce the weight of a pointer, increase its cantilever strength and reduce the number of operations in its construction.

Another object of my invention is to provide a balance member that is so constructed and related to a pointer as to permit adjustment relative thereto by simple thrust movement along a portion thereof at any time, without previous preparation or manipulation, such as the breaking of a seal or the movement of a nut or other locking element.

Another object of my invention is to provide a pointer structure including a balance member and a portion for receiving the same under stress whereby the balance member is retained in adjusted position.

A further object of my invention is to provide a pointer structure that shall be simple and durable in construction, economical to manufacture and effective in its operation.

Heretofore in indicating instrument practice, it has been usual to provide a substantially cruciform index or pointer mounted on a shaft or spindle at right angles to the plane of movement of the pointer.

In such structure, there is a relatively long index arm for cooperation with a scale and three shorter arms, known as tail and cross arms, for the reception of balance members. The latter are either fixed to the tail and cross arms or mounted thereon for adjustment therealong. In the usual forms of adjustable balance structure, the tail and cross arms are screw-threaded and the balance members comprise nuts for cooperation therewith.

It has been customary to construct the pointer of two separately-fabricated pieces, with the index arm constituting one piece and the tail and cross arms constituting the other, and to suitably join these pieces.

This joint is not only a tedius, unnecessary and expensive item but also, tends to unbalance the structure, where the solder, or other joining medium, is not uniformly distributed.

Also, in pointer structures embodying adjustable balance members, to which type my invention relates in one of its aspects, although not entirely so limited, there has been difficulty in effecting the adjustment, without disturbing the delicate instrument parts.

Any balance member for such structure should be adjustable without removing material, such as solder, and without imposing undue force against the delicate parts in the operation.

The removal of material disturbs the balance, and the imposition of undue force is likely to damage the parts. Screws provide back lash or lost motion relative to the pointer and sometimes impose disturbing torsional forces on the tail and cross arms during adjustment.

Further, it has been the practice to construct relatively long index arms as tubes or solid rods of uniform cross section or of tapered form, in each of which shapes the arm is too heavy, too thin or has excess material.

It is my aim to overcome all of the above-mentioned objections and to provide a pointer that shall be, in general, an improvement over pointers heretofore employed.

Accordingly, in practicing my invention, I provide a one-piece pointer embodying index, tail and cross arms, and balance members of such construction and relation to the tail and cross arms as to be effectually self-held in position ready for adjustment, without the imposition of torsional or undue stresses of any kind.

The arms are preferably of relatively thin sheet-aluminum-alloy bent to substantially channel shape therealong to resist lateral bending and the channel of the index arm is preferably of gradually decreasing depth toward its outer end.

These features, broadly, and more specifically in combination and in the details thereof, constitute my invention, whereby the stated objects of the invention are attained and a structure is provided that may have other attributes incident thereto.

Figure 1, of the accompanying drawing, is a plan view, of a pointer constructed in accordance with my invention, the balance members being omitted, Fig. 2 is a side elevational view of the structure of Fig. 1, taken at right angles thereto, Fig. 3 is a view, similar to Fig. 1, of the structure thereof and of the balance members of my invention.

Fig. 4 is an end view of a double helix from which the balance members of my invention are formed, Fig. 5 is a side view of the helix shown in Fig. 4, and Fig. 6 is a balance member of my invention in the shape it naturally assumes when severed from the helix of Figs. 4 and 5, as at a—a in Fig. 5.

The pointer comprises a target 2, on an index arm 3, cross arms 4, a tail arm 6 and a web of supporting portion 7, at the intersection of the arms and having a recess 8 for the reception of a usual shaft. All of the pointer parts, above set forth, are provided in one piece of sheet material, preferably aluminum alloy, that is punched or pressed from a blank.

The target 2 and the index arm 3, for a portion of its length adjacent to the target, are preferably flat, the arm 3 having a customary diagonal section 9 to place parts of the pointer in offset parallel relation to the plane of operation of the pointer, as more clearly indicated in Fig. 2.

The index arm 3, for the greater portion of its length, and the cross and tail arms 4 and 6, respectively, are bent to substantially channel shape longitudinally thereof to render the same of greater effective thickness than the flat portion of the index arm normal to the plane of operation of the pointer for the reception of balance members 12 and to resist lateral bending.

The depth of the channel of the index arm 3 gradually varies from its deepest portion adjacent to the web 7 to a portion adjacent to the target 2, where the channel merges into the plane portion of the pointer, the channel depth thus varies in accordance with the distance from the point of support to provide strength and to conserve material and weight.

In a solid index arm, there is insufficient mass adjacent to the point of support, an excess mass adjacent to the target and weak resistance against cantilever or lateral bending. In a tubular pointer there is excess material and the resulting construction is undesirably heavy.

In pointers of similar construction heretofore employed, there has been a joint between the index arm, on the one hand, and the tail and cross arms on the other hand.

The single piece structure above described is exceptionally light in weight because of its shape and material, strong for its weight because of its material and channeled sections, and balanced and symmetrical because of the absence of joints.

The tail and cross arms are preferably of semi-circular cross section conforming to inner surfaces of the balance members 12 thereon and have rounded outer ends, as indicated in Fig. 2, to facilitate placing the balance members over the ends of these arms.

In constructing the balance members 12, one of which is shown enlarged in Fig. 6, a relatively fine wire, of resilient material such as phosphor-bronze, is wound on a mandrel in the form of an elongated helix having a diameter substantially the same as the external dimensions of the balance arms 4. The elongated helix is then wound on a larger mandrel, to the shape shown in Figs. 4 and 5, thereby constituting a double helix. A portion of the double helix is then severed, as at a—a in Fig. 5 to constitute a balancing member 12 which assumes a shape as shown in Fig. 6. This is the shape which the element naturally seeks, so that, when bent or distorted out of this form, which it must be to place it on one of the arms 4, it will tend to return thereto, when the distorting force is removed, thereby firmly gripping the arm 4.

In this position and condition, the balance member may, at any time and by a simple thrust movement, be moved along its arm by hand, or by a pointed instrument, in such manner as to preclude the imposition of undue force against the pointer and its bearings.

The sides of the channeled arms 4 and 6 react laterally to the stress imposed by the balance members and may, in fact, supply the initial stress to which a relatively rigid balance member of similar form thereon would react.

Other modifications, maintaining the proper relation of parts, may be provided to effect substantially the same results, and while I have shown and described a particular form of my invention, changes may be effected therein without departing from the spirit and scope thereof, as set forth in the appended claims.

I claim as my invention:

1. An instrument pointer including an arm, a balance member for cooperation with said arm, said member being in the form of a segment of a double helix.

2. A meter pointer comprising a one-piece substantially cruciform sheet-aluminum-alloy member having index, tail and cross arms of channel shape in cross section, the channel of the index arm gradually decreasing in depth from a position adjacent to the intersection of the arms toward the outer end of the index arm, and a balance member on each of the tail and cross arms, each of said balance members being in the form of a double helix surrounding one of the arms and capable of a thrust frictional movement therealong and being biased laterally thereagainst.

3. An instrument pointer including an arm, a balance member for cooperation with said arm, comprising a member of helical shape having an internal diameter substantially the same as the width of said arm and having a curved longitudinal axis.

In testimony whereof, I have hereunto subscribed my name this 7th day of March 1932.

FERNALD S. STICKNEY.